United States Patent Office 3,379,548
Patented Apr. 23, 1968

3,379,548
WATER-DISPERSIBLE ALKYDS
AND ALKYD RESINS
Yun Jen, Anaheim, Calif., assignor to Chevron Research
Company, a corporation of Delaware
No Drawing. Filed June 2, 1960, Ser. No. 33,366
16 Claims. (Cl. 106—245)

The present invention relates to the preparation of water-dispersible alkyd resins.

Numerous ways for emulsifying an alkyd resin have been proposed. For example, U.S. Patent No. 2,220,685 teaches the emulsification of a conventional alkyd by the use of casein and triethanolamine-oleic acid soap. In U.S. Patent No. 2,587,657 the preparation of glossy alkyd emulsions is described by employing soap of oleic acid. More recently, as shown in U.S. Patent No. 2,634,245 to Arndt, it has been proposed to prepare water-dispersible oil-modified alkyd resins by reacting polyethylene glycol with a preformed or prepolymerized alkyd. This latter method for the preparation of emulsified alkyds is particularly advantageous in that the resulting composition is not subject to attack by molds or bacteria.

The present invention may be regarded as an improvement over the aforesaid U.S. Patent No. 2,634,245 to Arndt and it is predicated on the use of an alkoxy polyethylene glycol, particularly methoxy- or ethoxy-polypropylene glycol, in place of the difunctional polyethylene glycol described in the Arndt patent, the monofunctional polyethylene glycol moreover being introduced into the alkyd by in situ polymerization, that is, during the polyesterification reaction of the alkyd- forming reactants, as distinguished from Arndt's post-reaction of alkyd with polyethylene glycol. When proceeding in accordance with the present manner, ease of effecting water-dispersion with lesser quantities of modifier, i.e., alkoxypolyethylene glycol, is possible, it moreover having been found that danger of premature gelling is obviated; i.e., time and temperature with respect to the addition of the monofunctional polyethylene glycol compound are not so sensitive as is the case with difunctional polyethylene glycol (column 4, lines 39–41, of the patent). Satisfactory amounts of modifier can range from 5 to 30%, preferably 10 to 20%, by weight based on combined weight of alkyd-forming reactants and the modifier.

In the preparation of the water-dispersible alkyd resins of the present invention, conventional alkyd processing techniques and conventional alkyd-forming ingredients are employed. In general, the alkyd resins can be defined as complexes having molecular weights in the range 1500–20,000 (end group titration) which are formed from the esterifiction reaction of polyhydric alcohols, having 2 to 10 carbon atoms and 2 to 6 hydroxyl groups, and resinifying carboxylic organic acids, i.e., polybasic acids and their anhydrides, such as adipic acid, o-phthalic acid or phthalic anhydride, isophthalic acid and the various derivatives thereof as shown in U.S. Patents No. 2,627,508 and No. 2,895,932. The polyesterification reaction, as known, can be carried out in the presence of a solvent (solvent method; see U.S. Patent No. 2,308,498) or in the absence of a solvent (fusion method).

Often, although in accordance with the present invention not necessarily, the alkyd as above described is modified by the introduction of organic monocarboxylic acid, monoglycerides and/or diglycerides derived from oils or fats of vegetable, animal or fish origin to replace a portion of the polycarboxylic acid in the resin. The amount of oil present in percent by weight of the final resin, calculated as triglyceride, which may range up to 85%, is known as oil length of the resin.

As examples of oil-modifying agents, there can be mentioned the oil fatty acids of castor, dehydrated castor, coconut, cottonseed, fish linseed, oiticica, palmitic, perilla, safflower, soybean, tall, tung, and the like. Some of these oils, containing unsaturation, thereby capable of undergoing cross-linking or curing, are of the drying type, while others, containing no unsaturation, are of the nondrying type. As indicated, the resins of the present invention can be prepared from either or neither. Monobasic acids, such as butyric, 2-ethylhexoic, pelargonic, lauric, benzoic, t-butylbenzoic, toluic, hexoic, stearic, and the like can also be employed, desirably to modify the alkyd.

Customarily, the conversion of the above oils to the monoglyceride and/or diglyceride is effected by alcoholysis, i.e., reaction of the oil with polyhydric alcohol at elevated temperatures, for example, 425–450° F., in the presence of a transesterification catalyst e.g., litharge, sodium alcoholate, calcium stearate, lithium ricinoleate, and the like, examples of the polyhydric alcohol being glycerol, trimethylolethane, trimethylolpropane, ethylene glycol, propylene glycol, diethylene glycol, dipropylene glycol, pentaerithritol, dipentaerithritol, sorbitol, mannitol, neopentyl glycol, and the like. Alcoholysis is determined to be complete when a sample of the reaction mixture diluted with 3–4 times its volume of methanol gives a clear solution (methanol test), or when three parts, by weight, of the reaction mixture mixed with one part of phthalic anhydride heated on a hot plate gives a clear melt (phthalic pill test).

As is known in the art, the oil modification of the resin can be effected by a direct one-stage cooking of monocarboxylic fatty acids with a polyhydric alcohol and a polycarboxylic acid. Further, a two-stage process is often employed, in accordance with which the alcoholysis reaction is effected in the first stage as above described, while in the second stage the mixture of partial esters is condensed or esterified with a polycarboxylic acid to the desired acid number, usually below 50, or to the desired viscosity, for example, U to Z, when the resin is diluted with 50%, by weight, of naphtha. When this second method of manufacturing the alkyd resin is employed, the modifier of the invention, e.g., methoxypolyethylene glycol, is added during the condensation step, namely, after the alcoholysis step.

The alkoxypolyethylene glycol modifiers employed in accordance with the invention are commercially available products, and can be obtained by effecting the condensation of ethylene oxide in the presence of a suitable alcohol, e.g., methanol or ethanol. They can be defined as substantially the water-soluble alkoxy monoether derivatives of polyethylene glycols, such as methoxy-, or ethoxypolyethylene glycols or the polyethylene glycol monomethyl and monoethyl derivatives of the polyethylene glycols, the latter ranging in average molecular weight from about 300 to 6000, preferably 300 to 1500 or 2000. The higher molecular weight materials are known as "Carbowaxes" and are offered commercially under a designated number, e.g., 300, 400, 600, 750 and up, indicating approximate average molecular weight, the 300 grade, for example, being formed of polyethylene glycols of molecular weight in the range 285–315.

The manner of effecting dispersion of the modified alkyd resin in water is not critical. By efficient stirring the resin can be stirred into water or the water into resin to form an emulsion or a solution. The temperature employed is also not critical; however, in the case of very viscous resins, it may be found advantageous to pour the resin while still hot into water, thereby simplifying the handling of the viscous mass. In the formation of the dispersion, it is also often desirable to incorporate a small amount of base, such as ammonia, triethylamine, ethanolamine, and the like, for purposes of neutralization. While the resin is dispersible in the water in wide proportions, dispersions having a solids content in the range 30–80%, preferably 35–70%, are mentioned as representative.

The above-described process may be illustrated by the following flow diagram, the specified conditions being taken as representative:

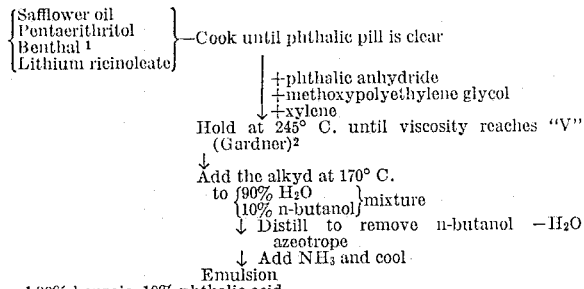

¹ 90% benzoic, 10% phthalic acid.
² 60% solid in Socal solvent 170L (aromatic solvent having a flash point of 80° F., gravity of 85, and analine point of 71.6) at 25° C.

As hereinbefore indicated, conventional oil-modified alkyd preparation is followed in the preparation of the water-dispersible alkyd resins of the invention. Whenever an oil is used instead of monocarboxylic acid, the alcoholysis step is carried out prior to the ester polycondensation; in this case, the alkoxy polyethylene glycol is added after completion of alcoholysis and simultaneously reacted with the polyesterification reactants. Otherwise, all reactants can be charged at one time, and the alkoxypolyethylene glycol reacted simultaneously with the reactants of the condensation or polyesterification reaction.

In the examples that follow, the polyesterification reaction was effected in a glass flask equipped with stainless steel stirrer, inlet for nitrogen gas, thermometer, and a trap for removing water of condensation. Heat was supplied by electric mantle controlled by a variable setting powerstat. In most cases, the so-called "solvent cook" was adopted and the charge to the reaction vessel contained approximately 5% of xylene. Throughout the polymerization, normally carried out at 220–250° C., the nitrogen gas was passed at a rate of 100 ml./min./l., and at the end of the polymerization, the rate was increased to remove as much residual xylene as possible. The viscous mass was cooled to about 170° C. and gradually added, with adequate stirring, to distilled water containing sufficient amount of alkali for neutralization. In some cases, it was found that by introducing an amphipathic solvent, e.g., 10% n-butanol in the water before introducing the alkyd resin, a much better emulsion is obtained. The n-butanol can later be stripped off by distillation without harming the emulsion. The emulsion so obtained is low in viscosity (ca. 0.5 poise). Particle size of the emulsion is also small, i.e., less than 1 micron, and the emulsion withstands freeze-thaw cycles without any appreciable change.

Tabulated in Table I are alkyd resins which it was attempted to render emulsifiable by the use of uncapped polyethylene glycol of the indicated average molecular weight.

TABLE I.—POLYETHYLENE GLYCOL MODIFIED ALKYD

| Example | Composition of Alkyd | Carbowax Grade (PEG) | Percent PEG on Alkyd | Viscosity of Alkyd ² | Remarks |
|---|---|---|---|---|---|
| 1 | 270 g. Alcoholysis Product,¹ 100 g. Phthalic Anhydride | 1,540 | 10 | "F" | W/O emulsion. |
| 2 | do | 1,540 | 15 | "K" | Do. |
| 3 | do | 1,540 | 5 | "D" | Do. |
| 4 | 270 g. Alcoholysis Product,¹ 100 g. Phthalic Anhydride plus 20 g. Glycerol. | 1,540 | 10 | "D" | O/W emulsion; very slow drying. Emulsion settled on standing. |
| 5 | 270 g. Alcoholysis Product,¹ 100 g. Phthalic Anhydride | 400 | 10 | "F" | Emulsified only after adding 10 g. Tall Oil fatty acids. Poor emulsion. Coarse particles. |
| 6 | 270 g. Alcoholysis Product,¹ 128 g. Phthalic Anhydride | 400 | 20 | "H" | Not emulsifiable. |

¹ Alcoholysis products were prepared from: Safflower Oil, 2,715 parts; Pentaerythritol, 990; Benthal, 334 (90% benzoic, 10% phthalic acid); Condition: 245° C. until phthalic pill clear.
² Viscosity determined at 60% solid, Gardner-Holdt Scale, measured at 25° C. in aromatic solvent having a Flash point of 80° F., Gravity of 85, and aniline Point of 71.6.

In most cases, as indicated above, when polyethylene glycol, regardless of its molecular weight, is used, the modified alkyd forms undesirable stable water-in-oil (W/O) type emulsion. Only in a few exceptions, as represented by Example 4, where the viscosity of the modified alkyd was extremely low, did the stable oil-in-water (O/W) type emulsions form. The observation was found to be invariably true throughout the study regardless of the quantity of polyethylene glycol, up to 20% on the weight of alkyd portion, employed. However, the low viscosity alkyds were slow to dry in air, and were therefore considered unsatisfactory.

It may be pointed out here that for a satisfactory alkyd emulsion dilutable with water, it must be of the O/W type, because only in the O/W type the water is in continuous phase. It may also be added that the viscosity of the emulsion is governed by the continuous phase. Therefore, all the W/O type alkyd emulsions were extremely viscous and remained so, even on continuing dilution with water up to the limiting point.

As shown in Table II, when a modifier of the present invention is employed, e.g., methoxypolyethylene glycol (MPEG), alkyds of high molecular weight can be emulsified to form O/W type emulsions. The emulsions, moreover, yielded products with small particle sizes in the range of <1 micron range. Indeed, in concentrated form, Resin No. 8 was essentially a solution rather than an emulsion. The viscosity of the aqueous solution of this resin at 50% was thus high, reflecting the high molecular weight of the polymer. These emulsions were stable against freeze-thaw cycles.

TABLE II.—METHOXYPOLYETHYLENE GLYCOL MODIFIED ALKYD

| Example Resin No. | Composition | Carbowax Grade (MPEG) | Percent PEG on Alkyd | Viscosity of Alkyd and/or Acid Number | Remarks |
|---|---|---|---|---|---|
| 7 | 270 g. Alcoholysis Product,[1] 100 g. Phthalic Anhydride. | 750 | 10 | "F"[2] | O/W emulsion, visc. = 20 poise. Solids 50%; pH, 9.5. |
| 8 | 292 g. Rosin, Water-White, 84 g. Maleic Anhydride, 1.2 g. Triphenyl Phosphite, 75 g. Glycerine, 65 g. MPEG, 191 g. Tall Oil Fatty Acid, 6 g. Maleic Anhydride. | 750 | 10 | Acid No. 39 | Dark green solution 43% solid. Viscous. Freeze-thaw stable. |
| 9 | 283 g. Tall Oil Fatty Acid, 6.5 g. Maleic Anhydride, 98 g. Penterythritol, 50 g. MPEG, 110 g. Phthalic Anhydride. | 750 | 10 | "Z2" at 70% in odorless Mineral Spirit, Acid No. 14.9. | O/W emulsion, visc., 200 cps.; Solids, 50.8%; pH, 4.7. |
| 10 | Same as Resin No. 8 except percent MPEG | 750 | 5 | Acid No. 19 Visc. "C" at 50% in naphtha. | O/W emulsion. Extremely thick. Freeze-thaw stable. |
| 11 | Same as Resin No. 9 except percent MPEG | 750 | 5 | "Z" at 50% in odorless Spirit, Acid No. 8.9. | O/W emulsion. Thick. |
| 12 | 270 g. Alcoholysis Product,[1] 100 g. Phthalic Anhydride. | 750 | 5 | "U"-"V"[2] | O/W emulsion. |
| 13 | Same as Resin No. 9, Further reacted with 120 g. Styrene with 2.0 g. Di-t-butyl peroxide at 165° C. for 4 hours. | 750 | 5 | Acid No. 15.7 prior to styrenation. | O/W emulsion. pH, 8.7. |
| 14 | 900 g. Tall Oil Fatty Acids, 63 g. Maleic Anhydride, 120 g. MPEG, 162 g. Pentaerythritol, 60 g. Phthalic Anhydride. | 750 | 10 | "Q" at 70% in odorless Mineral Spirit. | O/W emulsion. pH, 8.7. |
| 15 | Same as Resin No. 14, Further reacted with 120 g., styrene and 5 g. Di-t-butyl peroxide. | 750 | 10 |  | O/W emulsion. Solids, 44%. pH, 8.6. |
| 16 | 547 g. Tall Oil Fatty Acids, 380 g. Iso-phthalic Acid, 215 g. Glycerine, 94 g. MPEG. | 750 | 8 | Acid No. 21 | O/W emulsion. Extremely thick. After treatment with 10% n-butanol and followed by distillation, emulsion became thin (50 cps.). Solids, 51%; pH, 6.3. |
| 17 | Same as Resin No. 7 | 750 | 10 | "V"[2] | Alkyd added to water containing 10% n-butanol. Distilled to remove azeotrope, ammonia added. Solids, 45.7%; pH, 3.6; Visc., 45 cps. Particle size <1 micron. Freeze-thaw stable. Good drying. |

See footnotes Table I.

The following additional examples are directed to non-drying oil-modified alkyds and oil-free alkyd resins. In all cases, satisfactory oil-in-water type emulsions or solutions were formed.

EXAMPLE 18

To a reaction flask, there were charged 2100 g. of safflower oil and 746 g. of isophthalic acid. The mixture was heated to 300° C. and cooled. At 190° C., 352 g. of pentaerithritol and 300 g. methoxypolyethylene glycol (Carbowax 750) were added. Polyesterification reaction was carried out at 250° C. until a sample diluted to 70% in mineral spirit had a viscosity of "Z1" on Gardner-Holdt Scale at 25° C. Two thousand grams of the warm resin (at 130° C.) were then poured into a mixture of 15 g. of triethylamine and 2000 g. of water with good agitation. A good alkyd emulsion was obtained.

EXAMPLE 19

An alkyd resin was prepared from the following ingredients:

360 g. trimethylol ethane (3 mol)
363 g. p-tertiarybutylbenzoic acid (2.03 mol)
299 g. adipic acid (2.04 mol)
128 g. isophthalic acid (0.77 mol)
220 g. Carbowax 750 (MPEG) (0.293 mol)

Water was removed during heating-up period and the temperature was not allowed to exceed 220° C. When a sample of resin cut at 50% in xylene solution measured "K" in Gardner-Holdt viscosity scale, the reaction was stopped by cooling. Eleven hundred grams of the alkyd resin were poured into a mixture of 20 g. of triethylamine and 1100 g. of water. A clear and viscous solution was obtained. The pH of the aqueous solution was 6.8.

This alkyd dispersion in water was found to form clear thermoset film after being baked with a water-soluble dimethylated trimethylol melamine resin.

EXAMPLE 20

A similar alkyd was prepared as in the above example except that 110 g. of Carbowax 750 (MPEG) was used instead of 220 g. After dispersing in water, an emulsion with a pH of 7.2 was obtained. The emulsion had a low viscosity.

EXAMPLE 21

A short oil alkyd was prepared from the following ingredients:

Part I

|  | G. |
|---|---|
| Safflower oil | 1155 |
| Glycerol, 96% | 675 |
| Li-ricinoleate | 1.2 |

Part II

| Isophthalic acid | 1287 |
|---|---|
| Carbowax 750 (MPEG) | 300 |
| p-Tertiarybutylbenzoic acid | 381 |

Alcoholysis of Part I was carried out at 250° C. for 1 hour. A sample was found to have passed the methanol test. The batch was cooled to 130° C. and Part II added. Polyesterification was carried out below 230° C. until a sample attained a viscosity of "M" on Gardner-Holdt Scale at 50% in xylene. Acid number of the resin was 10. Three thousand grams of the resin were dispersed in a mixture of 50 g. triethylamine and 3000 g. of water. An emulsion was obtained.

EXAMPLE 22

A non-drying oil-modified alkyd emulsion was prepared from the following ingredients:

Part I

|  | G. |
|---|---|
| Coconut oil | 400 |
| Glycerol | 230 |
| Li-ricinoleate | 0.32 |

Part II

| Isophthalic acid | 500 |
|---|---|
| Carbowax 750 (MPEG) | 100 |

Alcoholysis of Part I was carried out at 245° C. After one hour, a sample was found to have passed the methanol test. The mass was cooled to 200° C. and Part II was added. Polyesterification was carried out below 220° C. When a sample had a viscosity of "Z" on Gardner-Holdt scale at 50% in xylene and resin acid number of 15, the batch was cooled. One thousand grams of the alkyd were poured into a mixture of 20 g. triethylamine and 1020 g. of water with good agitation. A good oil-in-water type emulsion was obtained. This alkyd emulsion can be cured to insoluble state by blending with a water-soluble melamine-formaldehyde resin.

The foregoing examples illustrate the practice of the invention, but are not to be construed as limiting the invention thereto, since many modifications and variations of the invention can be made without departing from the spirit and scope thereof.

I claim:

1. In a process for the preparation of a water-dispersible alkyd resin, the steps of effecting esterification, in the presence of a water-soluble aliphatic monoether derivative of polyethylene glycol, of a polyhydric alcohol having 3 to 10 carbon atoms with a resinifying carboxylic organic acid-reacting material, substantially all of the polyhydric alcohol used in the esterification containing 3 to 6 hydroxyl groups, and the acid-reacting material being selected from the group consisting of dicarboxylic acids and their anhydrides, continuing esterification to produce a water-dispersible alkyd resin having a molecular weight in the range 1500 to 20,000 and a low acid number, said aliphatic monoether derivative of polyethylene glycol having a molecular weight above 300 and being employed in an amount of about 5 to 30 percent by weight based on it and alkyd-forming reactants.

2. Process according to claim 1, wherein the resinifying carboxylic organic acid-reacting material is selected from the group consisting of isophthalic acid and phthalic anhydride.

3. Process according to claim 1, wherein the aliphatic monoether derivative of polyethylene glycol is selected from the group consisting of methoxy- and ethoxypolyethylene glycol.

4. Process according to claim 3, wherein the aliphatic monoether derivative of polyethylene glycol is employed in an amount of about 10 to 20 percent.

5. In a process for the preparation of a water-dispersible, oil-modified alkyd resin, which comprises condensing as reactants a material selected from the group consisting of the phthalic acids and phthalic anhydride and a glyceride oil fatty acid partial ester of a polyhydric alcohol of at least three hydroxyl groups to a substantially low acid number, the steps of admixing with said reactants water-soluble aliphatic monoether derivative of polyethylene glycol having a molecular weight above about 300 in an amount of 5 to 30 percent, by weight, based on it and alkyd-forming reactants, and condensing the resulting mixture until a water-dispersible product is formed.

6. Process according to claim 5, wherein the aliphatic monoether derivative of polyethylene glycol is selected from the group consisting of methoxy- and ethoxypolyethylene glycol.

7. Process according to claim 6, wherein the aliphatic monoether derivative of polyethylene glycol is methoxypolyethylene glycol and is present in an amount of 10 to 20 percent.

8. In the process for the preparation of a water-dispersible, oil-modified alkyd having an oil length up to 85 percent, which comprises condensing as reactants a material selected from the group consisting of the phthalic acids and phthalic anhydride and a glyceride oil fatty acid partial ester of a polyhydric alcohol selected from the group consisting of glycerol and pentaerithritol to a substantially low acid number, the steps of admixing with said reactants water-soluble adiphatic monoether derivative of polyethylene glycol of average molecular weight above about 300, in an amount of 5 to 30 percent, by weight, based on it and alkyd-forming reactants, and condensing the resulting mixture until a water-dispersible product is formed.

9. Process according to claim 8, wherein the aliphatic monoether derivative of polyethylene glycol is present in an amount of 10 to 20 percent.

10. Process according to claim 8, wherein the aliphatic monoether derivative of polyethylene glycol is methoxypolyethylene glycol of average molecular weight at least about 750°.

11. An oil-modified alkyd resin emulsifiable to form an oil-in-water emulsion comprising the product of the simultaneous reaction of: (1) material selected from the group consisting of the phthalic acids and phthalic anhydride and a glyceride oil fatty acid partial ester of a polyhydric alcohol having at least three hydroxyl groups calculated to give an oil modification up to 85% oil length; and (2) water-soluble aliphatic monoether derivative of polyethylene glycol having a molecular weight above about 300, in an amount of 5 to 30 percent, by weight, based on (1) and (2), said emulsifiable alkyd resin having an acid number below 25.

12. Composition according to claim 11, wherein the polyhydric alcohol is selected from the group consisting of glycerol and pentaerithritol.

13. Composition according to claim 12, wherein the aliphatic monoether derivative of polyethylene glycol is derived from polyethylene glycol having an average molecular weight in the range about 300 to 1500.

14. Composition according to claim 13, wherein the aliphatic monoether derivative of polyethylene glycol is methoxypolyethylene glycol and the polyhydric alcohol is pentaerithritol.

15. A liquid water dispersible composition of matter which consists essentially of the reaction product of about 70–85% of a fatty oil selected from the group consisting of oitica oil, tung oil, perilla oil, safflower oil, soybean oil and tall oil modified with a polyhydric alkanol having 3 to 6 carbon atoms and 3 to 6 hydroxyl groups and a dicarboxylic acid having 4–8 carbon atoms, with a water soluble aliphatic monoether of polyethylene glycol having a molecular weight above about 300 and present in an amount of 5 to 30% by weight based on the total composition.

16. A liquid water dispersible composition of matter which consists essentially of the reaction product of about 70–85% of a fatty oil selected from the group consisting of linseed oil, oitica oil, tung oil, perilla oil, safflower oil, soybean oil and tall oil modified with a polyhydric alkanol having 3 to 6 carbon atoms and 3 to 6 hydroxyl groups and a dicarboxylic acid having 4–8 carbon atoms, with a water soluble aliphatic monoether of polyethylene glycol having a molecular weight above about 300 and present in an amount of 5 to 30% by weight based on the total composition.

References Cited

UNITED STATES PATENTS

| | | | |
|---|---|---|---|
| 2,819,235 | 1/1958 | Fink et al. | 260—22 |
| 2,889,293 | 6/1959 | Hensley et al. | 260—22 |
| 2,908,660 | 10/1959 | Belanger | 260—45.3 |
| 2,889,294 | 6/1959 | Layman | 260—22 |
| 2,944,991 | 7/1960 | Hart | 260—22 |
| 2,950,262 | 8/1960 | Bush et al. | 260—22 |
| 2,956,964 | 10/1960 | Christenson et al. | 260—22 |
| 2,895,946 | 7/1959 | Huffman | 260—75 |

OTHER REFERENCES

"Organic Coating Technology" (Payne), published by J. Wiley & Sons, 1954 (vol. 1, pages 290–293 relied on).

DONALD J. ARNOLD, *Primary Examiner.*

ALEXANDER H. BRODMERKEL, MORRIS LIEBMAN, ALPHONSO D. SULLIVAN, MILTON STERMAN, *Examiners.*

H. LEVINE, J. W. BEHRINGER,
*Assistant Examiners.*